(12) United States Patent
Koran et al.

(10) Patent No.: US 12,304,175 B2
(45) Date of Patent: *May 20, 2025

(54) POLYMER COATING LAYERS FOR USE WITH HOLOGRAPHIC OPTICAL ELEMENTS

(71) Applicant: SOLUTIA INC., St. Louis, MO (US)

(72) Inventors: Francois Andre Koran, Longmeadow, MA (US); Steven V. Haldeman, Hampden, MA (US)

(73) Assignee: Solutia Inc., St. Louis, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,757

(22) Filed: Mar. 8, 2024

(65) Prior Publication Data
US 2024/0208188 A1    Jun. 27, 2024

Related U.S. Application Data

(63) Continuation of application No. 17/596,631, filed as application No. PCT/US2020/043357 on Jul. 24, 2020, now Pat. No. 12,109,784.

(60) Provisional application No. 62/879,123, filed on Jul. 26, 2019.

(51) Int. Cl.
B32B 17/10    (2006.01)

(52) U.S. Cl.
CPC .. *B32B 17/10935* (2013.01); *B32B 17/10036* (2013.01); *B32B 17/1044* (2013.01); *B32B 17/10605* (2013.01); *B32B 17/10633* (2013.01); *B32B 17/10651* (2013.01); *B32B 17/10761* (2013.01); *B32B 17/1077* (2013.01)

(58) Field of Classification Search
CPC ........ B32B 17/10935; B32B 17/10036; B32B 17/1044; B32B 17/10605; B32B 17/10633; B32B 17/10651; B32B 17/10761; B32B 17/1077
USPC ........................................................ 156/106
See application file for complete search history.

(56) References Cited

U.S. PATENT DOCUMENTS

| 2,282,026 | A | 5/1942 | Bren et al. |
| 2,282,057 | A | 5/1942 | Hopkins et al. |
| 4,842,389 | A | 6/1989 | Wood et al. |
| 4,959,283 | A | 9/1990 | Smothers et al. |

(Continued)

FOREIGN PATENT DOCUMENTS

| EP | 0368898 A1 | 5/1990 |
| EP | 0324482 B1 | 3/1993 |

(Continued)

OTHER PUBLICATIONS

Co-pending U.S. Appl. No. 17/596,630, filed Dec. 15, 2021; Koran et al.

(Continued)

*Primary Examiner* — James D Sells
(74) *Attorney, Agent, or Firm* — Steven A. Owen

(57) ABSTRACT

Tie layers and structures that exhibit superior properties and that provide desirable optical properties when incorporated into laminates, such as windshields, windows or other glazings containing a holographic optical element (HOE) are disclosed. The tie layers, when used in a laminate in conjunction with the HOE film, optionally with additional polymer layers, maintain and do not detract from the HOE film properties.

17 Claims, 7 Drawing Sheets

(56) References Cited

U.S. PATENT DOCUMENTS

| | | |
|---|---|---|
| 4,965,152 A | 10/1990 | Keys et al. |
| 4,976,799 A | 12/1990 | Wood |
| 5,066,525 A | 11/1991 | Nakamachi et al. |
| 5,137,954 A | 8/1992 | DasGupta et al. |
| 5,313,292 A | 5/1994 | Wood et al. |
| 6,127,066 A | 10/2000 | Ueda et al. |
| 7,173,744 B1 | 2/2007 | Whiteside et al. |
| 8,399,097 B2 | 3/2013 | Bennison et al. |
| 8,399,098 B2 | 3/2013 | Bennison et al. |
| 8,999,608 B2 | 4/2015 | Rölle et al. |
| 11,104,178 B2 | 8/2021 | Roche |
| 2012/0231376 A1 | 9/2012 | Rolle et al. |
| 2014/0295329 A1 | 10/2014 | Weiser et al. |
| 2015/0017353 A1 | 1/2015 | Weiser et al. |
| 2016/0282719 A1 | 9/2016 | Weiser et al. |
| 2021/0373492 A1 | 12/2021 | Popkova et al. |
| 2022/0161525 A1* | 5/2022 | Koran ................. B32B 17/1044 |

FOREIGN PATENT DOCUMENTS

| | | |
|---|---|---|
| EP | 0407772 B1 | 10/1997 |
| EP | 3 461 636 A1 | 4/2019 |
| JP | H03-046687 A | 2/1991 |
| JP | H06 56484 A | 3/1994 |
| JP | H07 315893 A | 12/1995 |
| JP | H09 5526 A | 1/1997 |
| JP | 2000137427 A | 5/2000 |
| JP | 2000 276034 A | 10/2000 |

OTHER PUBLICATIONS

Co-pending U.S. Appl. No. 17/596,631, filed Dec. 15, 2021; Koran et al., now US Publication No. 2022-0161525.
Wade, Bruce; "Vinyl Acetal Polymers"; Encyclopedia of Polymer Science and Technology; 2016; 22 pages.
Notification of Transmittal of the International Search Report and the Written Opinion of the International Searching Authority, or the Declaration date of mailing Oct. 8, 2020 received in International Application No. PCT/US2020/043356.
Notification of Transmittal of the International Search Report and the Written Opinion of the International Searching Authority, or the Declaration date of mailing Oct. 8, 2020 received in International Application No. PCT/US2020/043357.
Office Communication notification date Sep. 28, 2023 received in co-pending U.S. Appl. No. 17/596,630.
Office Communication notification date Nov. 6, 2023 received in co-pending U.S. Appl. No. 17/596,631.
Notice of Allowance and Fee(s) due dated Feb. 29, 2024 received in co-pending U.S. Appl. No. 17/596,631.
Office Communication notification dated Apr. 24, 2024 received in co-pending U.S. Appl. No. 17/596,630.
Notice of Allowance and Fee(s) due dated Jun. 5, 2024 received in co-pending U. S. U.S. Appl. No. 17/596,631.
Notice of Allowance dated Dec. 18, 2024 received in co-pending U.S. Appl. No. 17/596,630.

* cited by examiner

POLYMER COATING LAYERS FOR USE WITH HOLOGRAPHIC OPTICAL ELEMENTS

CROSS REFERENCE TO RELATED APPLICATIONS

This application is a continuation of U.S. application Ser. No. 17/596,631, filed Dec. 15, 2021, now U.S. Publication No. 2022-0161525; which claims priority to International Patent Application No. PCT/US2020/043357 filed Jul. 24, 2020, now expired, which claims the benefit to U.S. Provisional Application No. 62/879,123 filed Jul. 26, 2019; the disclosures of which are herein incorporated by reference in their entirety.

FIELD OF THE INVENTION

The present invention generally relates to polymer coatings or layers such as tie layers used to encapsulate and protect holographic optical elements and laminates comprising these interlayers. More particularly, the present invention generally relates to polymer coatings or tie layers and laminates comprising polymer coatings or tie layers and at least one layer that comprises a holographic optical element.

DESCRIPTION OF THE RELATED ART

Generally, multiple layer glass panels comprise a laminate comprised of an interlayer or multilayer interlayer or interlayers sandwiched between two panes of glass. In some applications, a laminate may comprise only one pane of glass or other rigid substrate. The laminated multiple layer glass panels are commonly utilized in architectural window applications, in transportation vehicles (including automobiles, trucks, trains, boats, airplanes), and in photovoltaic solar panels. Multiple layer glass panels used in the first two applications are commonly referred to as laminated safety glass. Typically, the main function of the interlayer in the laminated safety glass is to absorb energy resulting from impact or force applied to the glass, keep the layers of glass bonded even when the force is applied, and if the glass is broken, prevent the glass from breaking away into sharp loose pieces. In addition to these safety benefits, interlayers can additionally give the laminated glass a higher sound insulation rating, reduce UV and IR transmission, and/or enhance the aesthetic appeal of the associated window.

Typically, interlayers intended for use in laminated glass applications are generally produced by mixing a polymer resin, such as poly(vinyl acetal), with one or more plasticizers and melt processing the mix into an interlayer by any applicable process or method known to one of skill in the art. After being formed, these interlayers, or multilayer interlayers, are typically wound onto rolls for storage prior to later use in multiple layer glass panels. Coatings or tie layers may be produced in same manner, or by mixing together the materials using mixing methods and equipment known in the art and then coating or forming a tie layer or coating.

Interlayers can be incorporated into multiple layer glass panels using various techniques known in the art. For example, at least one interlayer can be placed between two substrates and any excess interlayer can be trimmed from the edges, thereby creating an assembly. It is not uncommon for multiple interlayers to be placed within or between the two substrates thereby creating a multiple layer stack with exterior glass panels and multiple internal polymeric interlayers. Once formed, these stacks are typically processed to remove the majority of interfacial air by an applicable process or method known to one of skill in the art, such as through nip rollers, vacuum bag, vacuum ring, or another suitable de-airing mechanism. Additionally, the interlayer can be partially press bonded to the substrates by any method known to one of ordinary skill in the art. In a last step, the interfacial bonding generated during the deairing operation is typically rendered more permanent by a high temperature and/or pressure lamination process, some of which are known to one of ordinary skill in the art such as, but not limited to, autoclaving.

In other embodiments, a thinner layer, such as a coating or a tie layer, may be used alone or in combination with other layers. The coating or tie layer may be used as an adhesive to bond a substrate layer, such as a protective layer, to other layers. While a variety of different materials can be used as a substrate layer in laminated safety glass, polyethylene terephthalate (PET) is known for use as a plastic layer in laminated glass. Other materials include polyethylene naphthalate (PEN), polycarbonate, polyamide, polyimide, cellulose ester, polyester, and the like. The substrate layer may have an adhesive applied on one or both sides of it. It may be desirable to use a thinner layer such as a coating or tie layer in order to decrease optical distortion from variations in the thickness of the adhesive and the use of thicker layers such as polymer interlayers. Further, a thinner layer of adhesive allows a plastic layer to more closely follow the contours of curved glass in certain glass laminates and decrease or eliminate folding or wrinkling of the plastic layer or the adhesive layer during the lamination process, as well as a reduction or elimination of the waviness or applesauce effect of the plastic sheet and reduction or elimination of wrinkles. In order to assist with the issue of air removal in a laminate, the coating or tie layer may be embossed or have a surface imprinted on it to allow air to flow out of the laminate.

Higher performance laminates, such as windshields, are emerging that require additional functionality such as head-up displays (HUD). The polymeric layers must not hinder the optical properties of the glass laminates in which they are incorporated. Additional materials are being considered to provide the additional functionality needed.

Recent developments in materials, tooling, and patterning are enabling holography to transition from novelty products to high-end technology applications. One such possible application is the use of holographic elements or holographic optical elements (HOE) as angularly selective reflection elements for enabling automotive HUD technologies. Holography has progressed at an increasingly rapid rate in the last decade, with the use of holographic elements now proposed for applications such as fixed displays, automotive HUD applications, and user head mounted glasses/displays. In every one of these cases a reasonable tool set has been postulated, with an understanding of the type and pattern of holographic element structures required to produce the desired optical effects. In most cases, however, these technologies are still in the early phases of scaling and organizations are struggling to produce prototypes that meet fitness for use criteria.

One such example of early stage development effort is the use of holographics in automotive head up display applications. The use of holographic technology, using HOEs embedded in a windshield or windscreen to reflect light from a dash-mounted projector, has been proposed. The embedded HOEs would be designed to reflect light from a very tight set of angles, while allowing passage of light from most other angles; the result would be a windshield system that would reflect incoming light from an in-dash projector system, while providing light from all other angles unhindered passage through. This would enable a driver to simultaneously see what is occurring outside the vehicle, as well as perceive informational imagery projected from the dash.

Early innovators in this field have successfully designed and produced prototype HOE films capable of demonstrating the ability to both reflect angularly targeted projected light while maintaining the ability to transmit light through the film at other angles. There are, however, significant challenges in maintaining desired optical properties when incorporating these films into finished windscreens. Lamination of HOE films into a final laminated glass construct invariably leads to unintended material changes that affect the quality and intensity of the light reflected by the HOE. More specifically, in many cases combining commercially-available interlayers with HOE films results in deficiencies in terms of processability and/or functionality.

A large majority of the above described HOE failures can be linked back to the materials and processes used to make the final parts, such as windscreens. Attempts to laminate the HOE directly to, or with, traditional interlayer films, such as PVB and polyurethane (TPU) interlayers, leads to a significant reduction in the intensity of reflection response, typically on the order of 50 to 90%, although other reductions are possible. Isolating or protecting the HOE from the polymer interlayer by capping it with a rigid superstrate with limited permeability does help preserve the intensity of the response but has cost implications and can also have the unintended consequence of leading to wrinkling and mottling of the HOE films, at levels that compromise the quality of the reflection response (changes to reflected magnitude). Lamination quality, as evidenced by bake testing and/or visible air trapped around the periphery of the HOE, can also be compromised with the addition of rigid polymeric substrate cap layers.

Commercially available HOE films are comprised of different materials. In most cases, these films comprise a specially formulated elastomeric photopolymer film coated onto a rigid substrate. In the final reflection film, the HOE is patterned for the desired optical effect by using high intensity light (such as one or multiple lasers) to drive the chemistry that creates carefully designed zones with low and high refractive indices within the elastomeric photopolymer film. A low refractive index compound (LRIC) (or multiple LRICs) is often also incorporated into the photopolymer layer to increase the refractive index differences within the patterned structure, driving the intensity of the HOE response.

LRICs are typically short chain molecules that are mobile and typically at least partially miscible in most polymeric films. Lamination of an HOE containing such LRICs against a polymeric film that does not have the LRIC creates a concentration gradient that typically drives a fraction of these LRICs into the laminating film, and this typically results in an unacceptable reduction in the HOE reflection intensity. Final concentration levels in both the initial HOE and adjacent encapsulating layers will depend mainly on (1) the relative solubility of the LRIC in each layer, and (2) the relative thicknesses of each layer. Temperature, degree of contact, and time may also play a role in determining final concentration levels.

The miscibility of the LRIC in encapsulating films, coatings or layers typically used in glass lamination, for example PVB or TPU, results in a net transfer of these LRICs out of the original HOE film, and into the adjacent films or layers. This loss reduces the refractive index gradient within the HOE film, resulting in a lower reflection intensity. While capping the HOE film with a rigid crystalline or highly aligned superstrate prevents LRIC migration, mitigating the problem, such capping has been shown to often lead to other issues, such as cost, HOE film wrinkling and propensity for bubble formation, as previously described. There is clearly a need for a HOE film encapsulating system that prevents wrinkling, bubble formation, and unacceptable loss of LRIC from the HOE film.

Accordingly, there is a need for a coating(s) or tie layer(s) for use as an encapsulation film(s) in laminates that can provide the desired performance expected of traditional glass laminates, while simultaneously minimizing cost and not compromising the optical and physical properties of the HOE (or HOE film) incorporated into the laminate.

SUMMARY OF THE INVENTION

The present invention generally relates to tie layers and structures that exhibit superior properties and that provide desirable properties when incorporated into laminates, such as windshields, windows or other glazings containing a holographic optical element(s) (HOE). The tie layers, when used in a laminate in conjunction with the HOE film, optionally with additional polymer layers, maintain and do not detract from the HOE film properties.

BRIEF DESCRIPTION OF THE FIGURES

Embodiments of the present invention are described herein with reference to the following drawing figures, wherein.

DETAILED DESCRIPTION

Figure 1:
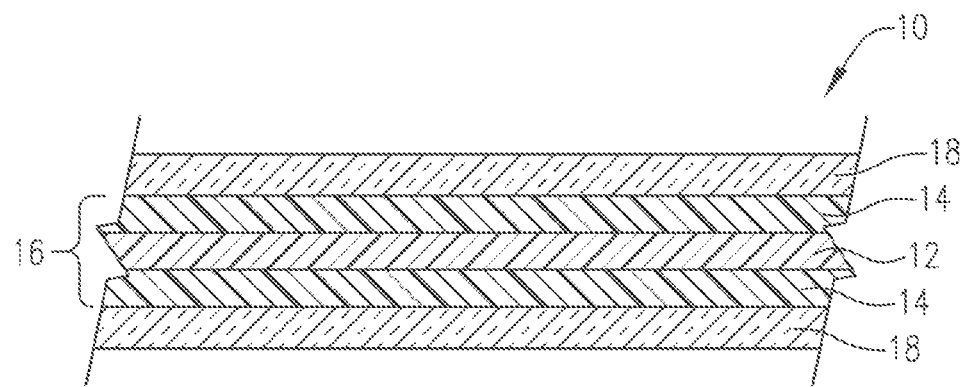
FIG. 1 depicts a cross-sectional view of an embodiment of a glass laminate containing an HOE film encapsulated between two interlayers.

The present invention generally relates to tie layers and structures that exhibit superior properties and that provide desirable optical properties when incorporated into laminates, such as windshields, windows or other glazings containing a holographic optical element (HOE). The tie layers, when used in a laminate in conjunction with the HOE film, optionally with additional polymer layers, maintain and do not detract from the HOE film properties. More particularly, the present invention generally relates to coatings or tie layers comprising LRICs, and the use of the tie layers in laminates comprising at least one HOE film. The present invention additionally relates to a multilayer interlayer or sheet comprising a polymer layer or interlayer and an HOE film, wherein the polymer layer and HOE film are in direct contact, wherein the multilayer interlayer may be incorporated in a laminate. As discussed in further detail below, the coatings and tie layers are formulated and selected such that they can be used with HOE films, as well as to form laminates having an HOE film incorporated therein. The coatings and tie layers described herein can provide desirable properties to the laminate while maintaining the desired optical properties sought in such laminates.

It has been discovered that coatings and tie layers can be successfully formulated with one or more LRICs so HOE films can be combined with tie layers and optional interlayers such that final partitioning levels maintain HOE effectiveness (that is, the effectiveness and intensity of the HOE is not significantly reduced). The one or more LRICs in the tie layer may be the same as or different from the LRICs in the HOE. Additionally, the chemical and physical nature of these tie layers can be modified to further enhance properties.

As used herein, the term "interlayer" refers to a single or multiple layer polymer sheet that may be suitable for use with at least one rigid substrate to form a multiple layer panel. The terms "single-sheet" and "monolithic" interlayer refer to interlayers formed of one single sheet, while the terms "multiple layer" and "multilayer" interlayer refer to interlayers having two or more sheets that are coextruded, assembled, laminated, or otherwise coupled to one another. As used herein, a "tie layer" refers to a layer or sheet in an interlayer that bonds at least two other layers together. The tie layer may be a coating, and the terms "coating" and "tie layer" may be used interchangeably herein. A tie layer is generally considerably thinner than a polymer layer or interlayer.

The term "multilayer interlayer" refers to polymer interlayers comprising at least two polymer layers. As discussed further below, the multiple layers may be separately extruded layers, co-extruded layers, or any combination of separately and co-extruded layers. Thus, the multilayered interlayer could comprise, for example, two or more single-layer interlayers combined together ("plural-layer interlayer"); two or more layers co-extruded together ("co-extruded interlayer"); two or more co-extruded interlayers combined together; a combination of at least one single-layer interlayer and at least one co-extruded interlayer; and a combination of at least one plural-layer interlayer and at least one co-extruded interlayer.

As used herein, a holographic optical element (HOE) refers to a holographic construction comprising at least a substrate referred to as a holographic element substrate and the holographic element or film, such as a volume hologram or polymeric volume hologram. The terms holographic optical element and holographic element may be used interchangeably. The HOE film is a polymer film that changes the way that light travels through the medium using holographic techniques to create a mirror like surface, typically semi-transparent, that reflects light at a specific set of angles while not reflecting light at other angles.

The tie layer may be used by itself, or it may also be used with another film, such as an HOE film, as an encapsulation layer which provides functional support to the HOE film such as covering, adhering to, protecting and the like. More than one encapsulation layer and film may be used, depending on the desired application and properties. For example, two interlayers may be used to encapsulate an HOE film (on both sides). In embodiments, one tie layer may comprise LRICs, while a second tie layer may be a conventional tie layer not comprising LRICs. In other embodiments, both (or all) tie layers may comprise LRICs.

As noted above, the coatings or tie layers can be used with optional polymer layers to form multilayer interlayers and laminates such as windscreens or other laminated glass panels useful in many applications. In various embodiments, these polymer layers can be formed from a thermoplastic resin such as ethylene vinyl acetate, thermoplastic polyurethane, ionomer, poly(vinyl acetal), and mixtures thereof. The various configurations and types of polymer layers are described in detail below.

The use of a certain polymer tie layer in combination with an HOE can provide beneficial properties to a glass laminate. When there is an HOE layer included, depending on the combination of layers and structure, the plasticizer may partition or move to or from the HOE layer, changing the layer thicknesses and properties of the HOE layer, so certain specially formulated types of interlayers may be preferred. The plasticizer portioning may also change the properties of the polymer layer(s).

Generally, the tie layers (and any optional polymer layers) can comprise at least 1, at least 2, at least 3, at least 4, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of one or more thermoplastic resins based on the total weight of the layer. Additionally or alternatively, the layers can comprise not more than 99, not more than 95, not more than 90, not more than 80, not more than 70, not more than 60, or not more than 50 weight percent of one or more thermoplastic resins based on the total weight of the layer, although other amounts may be used as desired. The types of layers and thermoplastic resins that can be used to produce such layers are described further below.

In various embodiments, a tie layer(s) and HOE layer(s) can be in direct contact with each other or can be indirectly disposed adjacent to each other through another layer. In one or more embodiments, at least one polymer layer and at least one HOE layer are in direct contact with each other when forming an interlayer or laminate. In such embodiments, the tie layer(s) and HOE layer are desirably directly bonded to each other, although adhesive agents may be utilized to enhance this bond. Generally, this bond can be a bond which forms when the layers are laid up against each other and the multilayer interlayer is heated to above the glass transition temperature of all layers. This can occur, for example, by laying up the layers against each other and using heat and/or pressure or by co-extruding the layers, or a combination of both.

In various embodiments, the optional polymer layers described herein may comprise at least two polymer layers (e.g., a single layer or multiple layers co-extruded) disposed in direct contact with each other. When three or more layers are employed in the multilayered interlayers, some of the layers can be referred to as skin layers and one or more may be referred to as core layers. As used herein, "skin layer" generally refers to outer layers of the interlayer and "one or more core layers" generally refers to one or more of the inner layer(s) disposed between the skin layers. At least one side of a core layer can be in direct contact with at least one side of a skin layer or may be in indirect contact with a skin layer through a tie layer, a coating or adhesive agent.

Exemplary layer configurations in multilayer interlayer embodiments include: skin/core/skin, skin/core, skin/core/core/skin, and skin/core/core/core/skin, as well as other embodiments are possible, as would be known to one skilled in the art.

FIG. 1 depicts an exemplary laminate 10 comprising an HOE film layer 12 and two polymer layers 14, which form the multilayer interlayer 16. As shown in FIG. 1, the complete interlayer structure 16 is interposed between two rigid substrates 18, such as glass.

Figure 2:
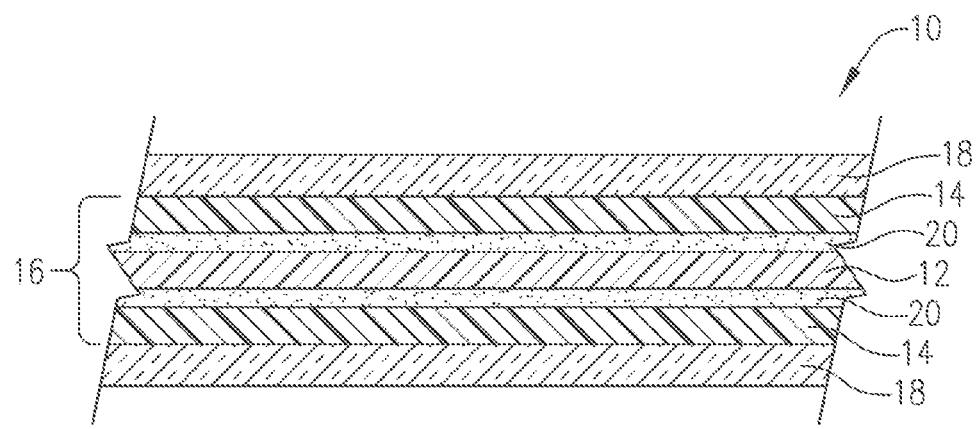
FIG. 2 depicts a cross-sectional view of another embodiment of a glass laminate containing an HOE film encapsulated between two interlayers with adhesive or tie layers between the HOE film and the interlayers.

FIG. 2 depicts an exemplary laminate 10 comprising a HOE layer 12, two polymer layers 14, and two tie layers 20, which form the multilayer interlayer 16. As shown in FIG. 2, the interlayer 16 is interposed between two rigid substrates 18, such as glass.

Multilayer interlayers described herein can also have more than three layers (e.g., at least 4, at least 5, at least 6, or up to 10 or more individual layers). In various embodiments, the multilayer interlayer structures can contain 2, 3, 4, or more polymer layers and 2 or more of them can be in direct contact with each other, with the HOE layer, or with other types of layers. The layers can have varying thicknesses, which are largely determined by the type of interlayer or laminate that the layer is being used in and can be any of the thicknesses desired.

In various embodiments, the thickness, or gauge, of any of the layers or interlayers can be at least about 0.5, at least about 1, at least about 2, at least about 3, at least about 4, at least about 5, at least about 6, at least about 7, at least about 8, at least about 9, at least about 10, at least about 15, at least about 20, at least about 25, at least about 30, at least about 35, at least about 40, at least about 45, at least about 50, at least about 55, at least about 60 mils or more, depending on the desired properties and application. In millimeters, the thickness of the polymer layers or interlayers can be at least about 0.025, at least about 0.05, at least about 0.075, at least about 0.10, at least about 0.125, at least about 0.150, at least about 0.175, at least about 0.20, at least about 0.225, at least about 0.25, at least about 0.38, at least about 0.51, at least about 0.64, at least about 0.76, at least about 0.89, at least about 1.02, at least about 1.15, at least about 1.28, at least about 1.52 mm or more.

The tie layers and optional polymer layers described herein can further include at least one plasticizer. Depending on the specific composition of the thermoplastic resin(s) forming the polymer layers, the plasticizer may be present in an amount of at least 1, at least 2, at least 3, at least 4, at least 5, at least 10, at least 15, at least 20, at least 25, at least 30, at least 35, at least 40, at least 45, at least 50, at least 55, at least 60 pounds per hundred resin (phr) or more. In embodiments, the amount of plasticizer may be not more than 120, not more than 110, not more than 105, not more than 100, not more than 95, not more than 90, not more than 85, not more than 75, not more than 70, not more than 65, not more than 60, not more than 55, not more than 50, not more than 45, or not more than 40 phr, although other amounts may be used depending on the specific materials and desired properties.

In various embodiments, the tie layer and any optional interlayer can contain at least 2, at least 5, at least 8, at least 10, at least 13, at least 15, at least 18, or at least 20 weight percent or more of at least one plasticizer based on the weight of the layer. Additionally or alternatively, the polymers can contain up to 100, up to 80, up to 70, up to 60, up to 50, up to 40, up to 30, up to 25, or up 20 weight percent of at least one plasticizer based on the weight of the polymer layer.

Useful low refractive index compounds or plasticizers for the tie layers and polymer layers include plasticizers having a low refractive index and that may be compatible with other materials, such as materials in the HOE film layer. While the low refractive index compounds are often referred herein to as plasticizers, other compounds having a low refractive index that will aid in adjusting the refractive index that may not be referred to as a "plasticizer" may also be used. Examples include, but are not limited to, LRICs such as fluorourethanes (or fluorinated urethanes) and fluorinated esters. The fluorourethanes may be obtained, for example by reacting isocyanates with fluorinated alcohols. Examples of useful LRICs may be fluorourethanes disclosed in U.S. Pat. No. 8,999,608 B2, the disclosure of which is incorporated by reference herein. In embodiments, the LRICs have a refractive index of less than about 1.45, or less than about 1.40, or less than about 1.35, or less than about 1.30, or less than about 1.25. In embodiments, LRICs having a refractive index as low as possible are desired.

In some embodiments, the polymer interlayer and polymeric volume hologram have similar materials properties such that plasticizer partitioning between the layers is similar, and the amount of plasticizer in the coating or tie layer is a quantity within a range of −25 to +25 weight percent of the concentration of plasticizer in the polymeric volume hologram. In embodiments, the polymer interlayer comprises a concentration of plasticizer within a range of −15 to +15 weight percent, or −10 to +10 weight percent, −5 to +5 weight percent, of the concentration of plasticizer in the original polymeric volume hologram.

In other embodiments in which the coating or tie layer and polymeric volume hologram have dissimilar materials properties such that plasticizer partitioning between the layers is dissimilar, the amount of plasticizer in the polymer interlayer may be lesser, or greater, than the total amount of plasticizer in the original polymeric volume hologram, and is to be determined through an understanding of the relative plasticizer partitioning between the layers. In some embodiments, the amount of plasticizer in the polymer interlayer is a quantity that is at least 1%, 5%, 10%, 20%, 30%, 40%, 50%, 60%, 70%, 80% or at least 90% of the weight percent of the concentration of plasticizer in the polymeric volume hologram. In other embodiments the plasticizer in the polymer interlayer is a quantity that is at least 101%, 110%, 120%, 130%, 140%, 150%, 200%, 300%, 400% or at least 500% or more of the weight percent of the concentration of plasticizer in the polymeric volume hologram.

In most embodiments, the coating or tie layer is formulated to minimize plasticizer uptake such that the plasticizer level in the fully encapsulated polymeric volume hologram is at least 70%, or at least 80%, or at least 90% of the starting level of plasticizer present in the original unlaminated or unencapsulated polymeric volume hologram.

In embodiments, the coating or tie layer comprises a plasticizer or plasticizer blend wherein the plasticizer or plasticizer blend is selected to have a refractive index within a range of −0.1 to +0.1 of the refractive index of the plasticizer or plasticizer blend in the original polymeric volume hologram. In embodiments, the plasticizer or plasticizer blend is selected to have a refractive index within a range of −0.05 to +0.05, or a range of −0.02 to +0.02 of the refractive index of the plasticizer or plasticizer blend in the original polymeric volume hologram.

Additional plasticizers may be used in the coatings or tie layers, particularly in coatings or tie layers not adjacent or in contact with the HOE, so long as the use of the plasticizer(s) does not adversely affect the desired properties of the final parts or cause the final properties of the laminate or other device which incorporates the polymer layer(s) and HOE to fall outside of the desired performance ranges. The plasticizer can be any that is known in the art. The plasticizer can be either monomeric or polymeric in structure. In various embodiments, the plasticizer can be a compound having a hydrocarbon segment of 30 or less, 25 or less, 20 or less, 15 or less, 12 or less, or 10 or less carbon atoms and at least 6 carbon atoms. Suitable conventional plasticizers for use in these interlayers include, for example, esters of a polybasic acid or a polyhydric alcohol, among others. Suitable plasticizers include, for example, triethylene glycol di-(2-ethylhexanoate) ("3GEH"), triethylene glycol di-(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, butyl ricinoleate, castor oil, dibutoxy ethyl phthalate, diethyl phthalate, dibutyl phthalate, trioctyl phosphate, triethyl glycol ester of coconut oil fatty acids, phenyl ethers of polyethylene oxide rosin derivatives, oil modified sebacic alkyd resins, tricresyl phosphate, and mixtures thereof. In certain embodiments, the plasticizer is 3GEH.

Additionally, other plasticizers, such as high refractive index plasticizers, may also be used, particularly in layers not adjacent or in contact with the HOE, either alone or in combination with another plasticizer. As used herein, the term "high refractive index plasticizer," refers to a plasticizer having a refractive index of at least 1.460. The high refractive index plasticizers may increase or reduce the refractive index of one or more of the layers, which may improve the optical properties of the interlayer, including mottle, haze, and/or clarity. In embodiments, the high RI plasticizers suitable for use can have a refractive index of at least 1.460, at least 1.470, at least 1.480, at least 1.490, at least 1.500, at least 1.510, at least 1.520 and/or not more than 1.600, not more than 1.575, or not more than 1.550, measured as discussed above.

When the coating or tie layer includes a high RI plasticizer, the plasticizer can be present in the layer alone or it can be blended with one or more additional plasticizers. Examples of types or classes of high refractive index plasticizers can include, but are not limited to, polyadipates (RI of 1.460 to 1.485); epoxides such as epoxidized soybean oils (RI of 1.460 to 1.480); phthalates and terephthalates (RI of 1.480 to 1.540); benzoates and toluates (RI of 1.480 to 1.550); and other specialty plasticizers (RI of 1.490 to 1.520). Specific examples of suitable RI plasticizers can include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), di-(butoxyethyl) terephthalate, di-(butoxyethyoxyethyl) terephthalate, and mixtures thereof. In embodiments, the high RI plasticizer may be selected from dipropylene glycol dibenzoate and tripropylene glycol dibenzoate, and/or 2,2,4-trimethyl-1,3-pentanediol dibenzoate. In various embodiments, the plasticizer can be selected from at least one of the following: benzoates, phthalates, phosphates, arylene-bis(diaryl phosphate), and isophthalates.

Other useful plasticizers include triphenyl phosphate, tricresyl phosphate, cresyldiphenyl phosphate, octyldiphenyl phosphate, diphenylbiphenyl phosphate, trioctyl phosphate, tributyl phosphate, diethyl phthalate, dimethoxyethyl phthalate, dimethyl phthalate, dioctyl phthalate, dibutyl phthalate, di-2-ethylhexyl phthalate, butylbenzyl phthalate, dibenzyl phthalate, butyl phthalyl butyl glycolate, ethyl phthalyl ethyl glycolate, methyl phthalyl ethyl glycolate, triethyl citrate, tri-n-butyl citrate, acetyltriethyl citrate, acetyl-tri-n-butyl citrate, and acetyl-tri-n-(2-ethylhexyl) citrate Mixtures of plasticizers can also be used. For example, a mixture of one or more LRICs and one or more conventional plasticizer may be used. Alternatively, two or more LRICs may be used alone, or with other non-conventional plasticizers.

The types of thermoplastic resins that can be used to form the coatings or tie layers, as well as any additional polymer layers, are described in further detail below.

EVA Layers

In various embodiments, one or more of the coatings or tie layers described herein can comprise, consist essentially of, or consist of an ethylene vinyl acetate ("EVA") resin. In such embodiments, the layer may also be referred to as an "EVA layer." These materials are commercially available, for example, as EVALAYER EV070C clear EVA film (from Interlayer Solutions), and as VISTASOLAR® 520.68 film (from TPI All Seasons Co., LTD), as well as from other suppliers.

In embodiments where at least one layer comprises EVA, the layer may comprise at least one LRIC. The EVA layer may also contain other plasticizers as desired, depending on the properties and other layers, if any. The amount of plasticizer, including any LRIC, may be in the same ranges as previously disclosed.

EVA having different levels of vinyl acetate co-monomer can be used, depending on the desired properties. In certain embodiments, the EVA comprises a vinyl acetate content of at least 70, at least 80, or at least 90 and/or not more than 99, not more than 98, or not more than 95 weight percent. In other embodiments, the vinyl acetate content may be less than 70 weight percent, such as at least about 10, or at least about 15, or at least about 20, or at least about 25 or more and/or not more than about 45, not more than about 40, not more than about 35 weight percent, or from about 20 to about 40 or about 25 to about 35 weight percent, although different amounts may be used depending on the desired application and properties.

In various embodiments, the EVA may comprise a formulated EVA, which in embodiments, may contain a silane additive, a peroxide additive, a co-activator, a UV blocker, and/or an antioxidant. Alternatively, the EVA can comprise an "unformulated" EVA, which is missing one or more of the above listed components contained in the formulated EVA, such as a peroxide additive (in which case the EVA would no longer be thermally reactive). In various embodiments, the EVA can be maleated.

The EVA layers can be used alone or in conjunction with other polymer layers, coatings or tie layers described herein to produce various types of multilayer interlayers, which can include other types of layers including poly(vinyl acetal) layers, such as polyvinyl butyral ("PVB") layers. Exemplary multilayer interlayer embodiments include but are not limited to: EVA/HOE/EVA, PVB/EVA/HOE/EVA/PVB, PVB/HOE/EVA, and PVB/HOE/EVA/PVB.

Although not wishing to be bound by theory, it is believed that the EVA layers can also function as tie layers between poly(vinyl acetal) layers and the HOE layer(s) or film(s) and can enhance the bond between these two layers. In such embodiments, the EVA layers can be at least partially interposed between the poly(vinyl acetal) and the HOE layer(s). In other embodiments, the EVA can be a separate layer that is not a tie layer.

Multilayer interlayers containing an EVA layer and one or more other polymer layers can be produced using any method known in the art. For example, each layer may be formed separately using techniques known in the art and then laminated together. Alternatively, multilayer interlayers containing an EVA layer and another polymer layer may be produced via co-extrusion.

Due to the crosslinking properties of EVA, it is generally desirable to avoid fully crosslinking the EVA when forming the EVA layer. Typically, partially crosslinked EVA is still able to be co-extruded with other polymer layers to form the multilayer interlayers. Thus, it can be desirable to utilize extrusion temperatures that do not fully crosslink the EVA.

Thermoplastic Polyurethane Layers

In various embodiments, the coating or tie layer described herein can comprise, consist essentially of, or consist of a thermoplastic polyurethane ("TPU") resin. In such embodiments, the polymer layer may also be referred to as a "TPU layer." One example is Product A4700NAT (commercially available from Covestro LLC—Specialty Films (previously Deerfield Urethane). In various embodiments, the TPU can comprise an aliphatic isocyanate-polyether or polyester urethane. Additionally, in certain embodiments, the TPU may also comprise a UV stabilizer and an antioxidant, as well as other additives, in order to provide additional stability to the TPU when it is exposed to heat and UV light.

In embodiments where the coating or tie layer comprises a TPU, the layer may comprise at least one LRIC. The TPU layer may also contain other plasticizers as desired, depending on the properties and other layers, if any. The amount of plasticizer, including any LRIC, may be in the same ranges as previously disclosed.

The TPU layers can be used in conjunction with the HOE layer(s) and other polymer layers described herein to produce various types of multilayer interlayers, which may also include poly(vinyl acetal) or PVB layers. Exemplary multilayer interlayer embodiments include but are not limited to: TPU/HOE/TPU, PVB/TPU/HOE/TPU/PVB, PVB/HOE/TPU and PVB/HOE/TPU/PVB.

Although not wishing to be bound by theory, it is believed that the TPU layers can also function as tie layers between poly(vinyl acetal) layers and the other layers of different materials as well as films, such as an HOE, and can enhance the bond between these two layers. In such embodiments, the TPU layers can be at least partially interposed between the poly(vinyl acetal) and the HOE layer(s) or film. In other embodiments, the TPU can be a separate layer that is not a tie layer.

Multilayer interlayers containing a TPU layer and another polymer layer can be produced using any method known in the art. For example, each layer may be formed separately using techniques known in the art and then laminated together. Alternatively, multilayer interlayers containing a TPU layer and another polymer layer may be produced via co-extrusion.

Ionomer Layers

In various embodiments, the coating or tie layer described herein can comprise, consist essentially of, or consist of an ionomer resin. In such embodiments, the coating or tie layer may also be referred to as an "ionomer layer."

Generally, the ionomer resin can comprise partially neutralized acid-ethylene copolymers. Furthermore, the ionomer resin can have an acid functionality in the range of, for example, from 0.1 to 30 weight percent, from 1 to 25 weight percent, or from 5 to 20 weight percent, based on the total weight of the polymer. In one or more embodiments, the ionomer resin can have at least 0.1, at least 1, at least 5, at least 10, at least 15 weight percent and/or not more than 30, not more than 25, or not more than 20 weight percent acid functionality from one or more acrylic acids. Such acrylic acids can include, for example, acrylic acid, maleic acid, maleic anhydride, methacrylic acid, itaconic acid, fumaric acid, monomethyl maleic acid, and mixtures thereof.

Furthermore, in various embodiments, the ethylene copolymer can be selected from the group consisting of acrylates, methacrylates, and combinations thereof. In such embodiments, the methacrylates can comprise methyl acrylate, methyl methacrylate, butyl acrylate, butyl methacrylate, glycidyl methacrylate, vinyl acetate, and mixtures thereof. Ionomer resins are further described in U.S. Pat. Nos. 8,399,097 and 8,399,098, the disclosures of which are incorporated herein by reference in their entireties.

In embodiments where the coating or tie layer comprises an ionomer, the layer may comprise at least one LRIC. The ionomer layer may also contain other plasticizers as desired, depending on the properties and other layers, if any. The amount of plasticizer, including any LRIC, may be in the same ranges as previously disclosed.

The ionomer layers can be used in conjunction with the other coatings or tie layers as well as other polymer layers and HOE layer(s) described herein to produce various types of multilayer interlayers, which may also include poly(vinyl acetal) layers. Exemplary multilayer interlayer embodiments include but are not limited to: ionomer/HOE/ionomer, PVB/ionomer/HOE/ionomer/PVB, PVB/HOE/ionomer and PVB/HOE/ionomer/PVB.

Multilayer interlayers containing an ionomer layer and another coating or tie layer can be produced using any method known in the art. For example, each layer may be formed separately using techniques known in the art and then laminated together. Alternatively, multilayer interlayers containing an ionomer layer and another polymer layer may be produced via co-extrusion.

Poly(Vinyl Acetal) Layers

In various embodiments, the coating or tie layer described herein can comprise, consist essentially of, or consist of a poly(vinyl acetal) resin, such as polyvinyl butyral. The poly(vinyl acetal) layers can be used in conjunction with the other coatings, tie layers or polymer layers described herein to produce various types of multilayer interlayers. Exemplary multilayer interlayer embodiments include but are not limited to: PVB/adhesive coating (or tie layer)/HOE/adhesive coating (or tie layer)/PVB, PVB/other polymer/HOE/other polymer/PVB, PVB/HOE/other polymer, PVB/HOE/PVB and PVB/HOE/other polymer/PVB.

The poly(vinyl acetal) resin can be produced formed by acetalization of poly(vinyl alcohol) with one or more aldehydes in the presence of a catalyst according to known methods such as, for example, those described in U.S. Pat. Nos. 2,282,057 and 2,282,026, as well as Wade, B. 2016, Vinyl Acetal Polymers, Encyclopedia of Polymer Science and Technology. 1-22 (online, copyright 2016 John Wiley & Sons, Inc.).

Poly(vinyl acetal) resins typically have a residual hydroxyl content, an ester content, and an acetal content. As used herein, residual hydroxyl content (calculated as PVOH) refers to the weight percent of moieties having a hydroxyl group remaining on the polymer chains. For example, poly (vinyl acetal) can be manufactured by hydrolyzing poly (vinyl acetate) to PVOH, and then reacting the PVOH with an aldehyde, such as butyraldehyde, propionaldehyde, and the like, and desirably butyraldehyde, to make a polymer having repeating vinyl butyral units. In the process of hydrolyzing the poly(vinyl acetate), typically not all of the acetate side groups are converted to hydroxyl groups. For example, reaction with butyraldehyde typically will not result in the conversion of all hydroxyl groups on the PVOH to acetal groups. Consequently, in any finished polyvinyl butyral, there typically will be residual ester groups such as acetate groups (as vinyl acetate groups) and residual hydroxyl groups (as vinyl hydroxyl groups) as side groups on the polymer chain and acetal (e.g., butyral) groups (as vinyl acetal groups). As used herein, residual hydroxyl content is measured on a weight percent basis per ASTM 1396.

In various embodiments, the poly(vinyl acetal) resin comprises a polyvinyl butyral resin, which is also interchangeably referenced herein as "PVB." An example of a polyvinyl butyral structure is used to further illustrate how the weight percentages are based from the moiety unit to which is bonded the relevant pendant group:

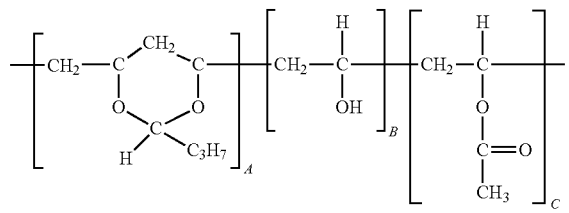

Taking the above structure of polyvinyl butyral, the butyral or acetal content is based on the weight percentage of unit A in the polymer, the OH content is based on the weight percentage of unit B in the polymer (a polyvinyl OH moiety or PVOH), and the acetate or ester content is based on the weight percentage of unit C in the polymer.

The hydroxyl group content of the poly(vinyl acetal) resin is not particularly limited, but suitable amounts are from at least 6, at least 8, at least 10, at least 11, at least 12, at least 13, at least 14, at least 15, at least 16, or at least 17 and in each case up to 35 weight percent or more of PVOH. In some embodiments, the poly(vinyl acetal) may have less than 15 weight percent, or less than 14, less than 13, less than 12, less than 11, less than 10, less than 9, or less than 8 weight percent residual hydroxyl content. In general, a poly(vinyl acetal) resin having a lower hydroxyl weight percentage has the capability of absorbing more plasticizer and absorbing it more efficiently.

The poly(vinyl acetal) resin can also comprise 20 weight percent or less, 17 weight percent or less, 15 weight percent or less, 13 weight percent or less, 11 weight percent or less, 9 weight percent or less, 7 weight percent or less, 5 weight percent or less, or 4 weight percent or less of residual ester groups calculated as polyvinyl ester, for example, acetate, with the balance being an acetal, such as butyraldehyde acetal, but optionally including other acetal groups in a minor amount, for example, a 2-ethyl hexanal group (see U.S. Pat. No. 5,137,954). As with the residual hydroxyl group measurement, the weight percent of residual ester groups (that is, residual acetate content) is based on the moiety in the polymer backbone onto which is linked the acetate group, including the pendant acetate group.

The poly(vinyl acetal) resin used in the invention can also have an acetal content of at least 50, at least 55, at least 60, at least 65, at least 70, at least 75, at least 80, at least 85, or at least 90 weight percent or more. Additionally or alternatively, the acetal content can be up to 94, up to 93, up to 92, up to 91, up to 90, up to 89, up to 88, up to 86, up to 85, up to 84, up to 83, up to 82, up to 80, up to 78, up to 77, up to 75, up to 70, or up to 65 weight percent.

The acetal groups in the poly(vinyl acetal) resins can comprise vinyl propynyl groups or vinyl butyral groups. In one or more embodiments, the acetal groups comprise vinyl butyral groups. In some embodiments, the poly(vinyl acetal) resin can include residues of any aldehyde and, in some embodiments, may include residues of at least one $C_4$ to $C_8$ aldehyde. Examples of suitable $C_4$ to $C_8$ aldehydes can include, for example, n-butyraldehyde, i-butyraldehyde, 2-methylvaleraldehyde, n-hexyl aldehyde, 2-ethylhexyl aldehyde, n-octyl aldehyde, and combinations thereof. One or more of the poly(vinyl acetal) resins utilized in the layers and interlayers described herein can include at least 20, at least 30, at least 40, at least 50, at least 60, or at least 70 weight percent or more of residues of at least one $C_4$ to $C_8$ aldehyde, based on the total weight of aldehyde residues of the resin. Alternatively, or in addition, the poly(vinyl acetal) resin may include not more than 99, not more than 90, not more than 85, not more than 80, not more than 75, not more than 70, or not more than 65 weight percent of at least one $C_4$ to $C_8$ aldehyde. The $C_4$ to $C_8$ aldehyde may be selected from the group listed above, or it can be selected from the group consisting of n-butyraldehyde, i-butyraldehyde, 2-ethylhexyl aldehyde, and combinations thereof.

The weight average molecular weight of the poly(vinyl acetal) resin is not particularly limited. The poly(vinyl acetal) resin can have a weight average molecular weight (Mw) of at least 20,000, at least 30,000, at least 40,000, at least 50,000, at least 60,000, or at least 70,000, with no particular upper limit, although practically up to 300,000 Daltons is suitable, although higher molecular weights may be be used in some cases, and in each case as measured by size exclusion chromatography using the low angle laser light scattering (SEC/LALLS) method of Cotts and Ouano in tetrahydrofuran, as known to one skilled in the art.

Multilayer interlayers containing a poly(vinyl acetal) layer and one or more other polymer layers can be produced using any method known in the art. For example, each layer may be formed separately using techniques known in the art and then laminated together. Alternatively, multilayer interlayers containing a poly(vinyl acetal) layer and one or more other polymer layers may be produced via co-extrusion.

In various embodiments, the HOE layer can be used with other polymer layers such as acoustic interlayers. Often, polymers that exhibit one set of desirable properties, such as acoustic performance, lack other desirable properties, such as impact resistance or strength. Therefore, in order to achieve desirable combinations of properties, multilayered interlayers can be produced containing a poly(vinyl acetal) layer exhibiting desirable acoustic performance and one or more other polymer layers providing impact strength and resistance. In one or more embodiments, the acoustic interlayers can contain a poly(vinyl acetal) layer having a Tg of at least −30, at least −25, at least −20, at least −15, at least −10, at least −5, or at least 0° C. and/or less than 40, less than 30, less than 25, less than 20, less than 15, less than 10, or less than 5° C.

Furthermore, in various embodiments, this poly(vinyl acetal) resin or poly(vinyl acetal) layer may exhibit enhanced acoustic properties, such as, for example, an improved tan delta as compared to a comparable poly(vinyl n-butyral) resin layer. Tan delta is the ratio of the loss modulus (G") in Pascals to the storage modulus (G') in Pascals of a specimen measured by Dynamic Mechanical Thermal Analysis (DMTA). The DMTA is performed with an oscillation frequency of 1 Hz under shear mode and a temperature sweep rate of 3° C./min. The peak value of the G"/G' curve at the glass transition temperature is the tan delta value. Higher tan delta values are indicative of higher damping, which can translate to better sound dampening, or acoustic, performance.

Moreover, in various embodiments, the poly(vinyl acetal) resin or poly(vinyl acetal) layer may exhibit a damping loss factor, or loss factor, of at least 0.10, at least 0.15, at least 0.17, at least 0.20, at least 0.25, at least 0.27, at least 0.30, at least 0.33, or at least 0.35. Loss factor is measured by Mechanical Impedance Measurement as described in ISO Standard 16940. To measure the loss factor, polymer samples are laminated between two sheets of clear glass, each having a thickness of 2.3 mm, and are prepared to have a width of 25 mm and a length of 300 mm. The laminated samples are then excited at the center point using a vibration shaker, commercially available from Brüel and Kjær (Nærum, Netherlands) and an impedance head is used to measure the force required to excite the bar to vibrate and the velocity of the vibration. The resultant transfer function is recorded on a National Instrument data acquisition and analysis system and the loss factor at the first vibration mode is calculated using the half power method.

According to some embodiments, the poly(vinyl acetal) resin or poly(vinyl acetal) layer may exhibit desirable acoustic properties, as indicated by, for example, the reduction in the transmission of sound as it passes through (i.e., the sound transmission loss of) the interlayer. In some embodiments, acoustic interlayers may exhibit a sound transmission loss at the coincident frequency, measured according to ASTM E90 at 20° C., of at least 34, at least 34.5, at least 35, at least 35.5, at least 36, at least 36.5, or at least 37 dB. During such sound transmission tests, the interlayers are laminated between two sheets of 2.3 mm clear glass and the test is conducted at a reference frequency of 3,150 Hz.

In various embodiments, in addition to the coatings or tie layers described herein, one or more of the polymers described herein can be a tie layer. The tie layer can comprise, consist essentially of, or consist of a thermoplastic resin selected from the group consisting of EVA, TPU, ionomer, polyvinyl acetate, ethylene vinyl alcohol, and combinations thereof.

Multilayer interlayers containing a tie layer and a HOE layer can be produced using any method known in the art. For example, each layer may be formed separately using techniques known in the art and then laminated together. Alternatively, multilayer interlayers containing a tie layer and a HOE layer can also be produced according to any suitable method, including, for example, extrusion coating, dip coating, solution coating, blade, paddle, air-knife, printing, powder coating, spray coating, and combinations thereof.

An additional adhesive coating or adhesion promotor may be used in conjunction with the HOE layers described herein to enhance the bonds between the HOE layers and various other layers in the multilayer interlayers as desired. In such embodiments, the adhesive coatings can be at least partially interposed and/or positioned between the interlayer(s) and the HOE layers. In embodiments, the adhesion promoter may be a silane adhesion promoter.

Methods for Producing the Interlayers

The interlayers according to various embodiments of the present invention can be made by any suitable process known to one of ordinary skill in the art of producing interlayers and is not limited to a method for its manufacture. For example, it is contemplated that the tie layers, polymer layers or interlayers may be formed by extrusion or co-extrusion. In an extrusion process, one or more thermoplastic resins, plasticizers, and, optionally, one or more additives as described previously, can be pre-mixed and fed into an extrusion device. The extrusion device is configured to impart a particular profile shape to the thermoplastic composition in order to create an extruded sheet. The extruded sheet, which is at an elevated temperature can then be cooled to form a polymeric sheet. Once the sheet has been cooled and set, it may be cut and rolled for subsequent storage, transportation, and/or use as an interlayer.

Co-extrusion is a process by which multiple layers of polymer material are extruded simultaneously. Generally, this type of extrusion utilizes two or more extruders to melt and deliver a steady volume throughput of different thermoplastic melts of different viscosities or other properties through a co-extrusion die into the desired final form. The thickness of the multiple polymer layers leaving the extrusion die in the co-extrusion process can generally be controlled by adjustment of the relative speeds of the melt through the extrusion die and by the sizes of the individual extruders processing each molten thermoplastic resin material.

The extrusion process can occur at temperatures known to one skilled in the art depending on the materials and application. The tie layers, polymer layers and interlayers described herein may be produced according to any suitable method. The resulting resin composition may be formed into a sheet or layer according to any suitable method including, but not limited to, solution casting, compression molding, injection molding, melt extrusion, melt blowing, and combinations thereof. When the layers or interlayers are multilayer interlayers including two or more layers or sheets, such multilayer interlayers can also be produced according to any suitable method, including, for example, co-extrusion, blown film, melt blowing, dip coating, solution coating, blade, paddle, air-knife, printing, powder coating, spray coating, and combinations thereof.

Alternatively, each tie layer and/or polymer layer of the interlayer can be separately formed or extruded into sheets, and the sheet can be laid up to form a laminate structure of the desired order, and then pressed under heat and pressure to form the multilayer interlayer. In various embodiments of the present invention, the tie layers, polymer layers or interlayers may be formed by extrusion or co-extrusion. In an extrusion process, one or more thermoplastic polymers, plasticizers, and, optionally, at least one additive, can be pre-mixed and fed into an extrusion device, wherein the layer or interlayer can be melted and extruded from a die to thereby provide an extruded sheet. Alternatively, one or more layers may be purchased or produced separately using known processes in the art.

Other additives may be incorporated into any one of the above-described layers used to form the laminates or interlayers in order to enhance the performance of the final product and impart certain additional properties to the interlayer. Such additives include, but are not limited to, adhesion control agents, anti-blocking agents, dyes, pigments, stabilizers (e.g., ultraviolet stabilizers), antioxidants, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers, among other additives known to those of ordinary skill in the art.

The additives, in liquid, powder, or pellet form, are often used and can be mixed into the thermoplastic resin or plasticizer prior to arriving in the extruder device or combined with the thermoplastic resin inside the extruder device. These additives are incorporated into the composition, and by extension the resultant interlayer, to enhance certain properties of the interlayer and its performance in a multiple layer glass panel product.

Laminates Comprising HOE Layers

Tie layers and interlayers as previously described may have improved properties and are useful with certain films such as HOE films. The tie layers comprising at least one LRIC may be combined with the HOE film through processes known in the art, such as encapsulation. In embodiments, the HOE film may have a tie layer (and optional interlayer) comprising at least one LRIC on one side (such as the HOE side of the HOE film) or on both sides. In other embodiments, the HOE film may have a tie layer comprising at least one LRIC on the HOE side of the HOE film and another tie layer on the substrate side of the HOE film.

Other combinations of layers are possible, such as additional interlayers, multiple layer interlayers, and/or interlayers having functional properties as previously described, may be used.

Properties and End Uses

The structures formed can be used in many applications, such as in laminates or panels comprising one or more rigid substrates. A panel made with the HOE film, tie layers and interlayers described herein, such as a glass panel which comprises an interlayer laminated between two glass substrates, can have good optical clarity. The clarity of the tie layer and interlayer laminated between glass substrates can be determined by measuring the haze value, which is a quantification of light not transmitted through the sheet glass panel containing the multilayer interlayer. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments, such as windshields, the interlayers described herein can exhibit a haze of less than 10, less than 9, less than 8, less than 7, less than 6, less than 5, less than 4, less than 3, less than 2, less than 1.5, less than 1, less than 0.75, or less than 0.5 percent as measured according to ASTM D1003-61. In other embodiments, optical properties may not be as critical or where less clarity is desired, a higher haze level may be desirable or acceptable.

Another parameter used to determine the optical performance is transparency, or percent visual transmittance (% $T_{vis}$), which is measured using a spectrophotometer, such as a HunterLab UltraScan XE, in accordance with ASTM D1003, Procedure B using Illuminant C at an observer angle of 2°. The values provided herein were obtained by analyzing a polymer sample which had been laminated between two sheets of clear glass, each having a thickness of 2.3 mm (commercially available from Pittsburgh Glass Works of Pennsylvania). In some embodiments where high visual transmittance is desirable, the resin compositions, layers, and interlayers of the present invention can have a percent visual transmittance of at least 50, at least 70, at least 80, at least 81, at least 82, at least 83, at least 84, at least 85, at least 85.5, at least 86, at least 86.5, at least 87, at least 87.5, at least 88, or at least 90 percent or more. For applications where a lower visual transmittance is desired, the percent visual transmittance may be less than 50 percent.

Yellowness Index ("YI") is another measure of optical quality. Yellowness Index of a polymer sheet is measured by laminating (and autoclaving) a 30 gauge (30 mil or 0.76 mm) sheet sample between two pieces of 2.3 mm clear glass using the HunterLab UltraScan XE according to ASTM Method E313 (formerly D-1925) (illuminant C, 2° observer angle) from spectrophotometric light transmittance in the visible spectrum. In various embodiments, the interlayers can exhibit a yellowness index of less than 20, less than 18, less than 16, less than 14, less than 12, less than 10, less than 8, less than 6, less than 5, less than 4, less than 3, less than 2, 1.5, less than 1.0, less than 0.75, less than 0.5, less than 0.4, or less than 0.3 according to ASTM E313.

The structures comprising HOE films, tie layers and optional interlayers according to embodiments of the present invention may be utilized in a multiple layer panel or laminate that comprises at least one substrate, such as a rigid substrate. As used herein, "rigid" is generally relative to other layers. Any suitable rigid substrate may be used and, in some embodiments, may be selected from the group consisting of glass, polycarbonate, biaxially oriented PET, copolyesters, acrylic, polyamide, cellulose triacetate, and combinations thereof. When the rigid substrate includes a polymeric material, the polymeric material may or may not include a hard coat surface layer. In some embodiments, the multilayer panels or laminates include a pair of rigid substrates with the resin interlayer disposed therebetween. In other embodiments, the multiple layer panels include a rigid substrate and the interlayer comprising the HOE layer between them, optionally including a tie layer, adhesive coating and/or adhesion promoter as needed.

In various embodiments, the structures containing the tie layers and interlayers of the present invention will most commonly be utilized in multiple layer panels comprising two substrates, typically a pair of glass substrates, with the HOE film, tie layers and interlayers disposed between the two substrates. These examples of multiple layer panels are in no way meant to be limiting, as one of ordinary skill in the art would readily recognize that numerous constructs other than those described above could be made with the interlayers of the present invention.

The constructions comprising tie layers or coatings and optional polymer interlayers described herein can be laminated between glass using techniques known in the art. The typical glass lamination process comprises the following steps: (1) assembly of the one or two substrates (e.g., glass) and interlayer(s), tie layer(s) and HOE film; (2) heating the assembly via an IR radiant or convective means for a short period; (3) passing the assembly into a pressure nip roll for the first deairing; (4) heating the assembly a second time at an appropriate temperature, such as about 50° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at an appropriate temperature and pressure, such as temperatures between 80 and 150° C. and pressures between 15 psig and 200 psig for about 30 to 90 minutes. Other means for use in de-airing of the interlayer-glass interfaces (steps 2 to 5) known in the art and that are commercially practiced include vacuum bag and vacuum ring processes in which a vacuum is utilized to remove the air. An alternate lamination process involves the use of a vacuum laminator that first de-airs the assembly and subsequently finishes the laminate at a sufficiently high temperature and vacuum.

The preferred forms of the invention described above are to be used as illustration only and should not be used in a limiting sense to interpret the scope of the present invention. Modifications to the exemplary embodiments, set forth above, could be readily made by those skilled in the art without departing from the spirit of the present invention. This invention can be further illustrated by the following examples of embodiments thereof, although it will be understood that these examples are included merely for the purposes of illustration and are not intended to limit the scope of the invention unless otherwise specifically indicated.

EXAMPLES

Various laminates having the configurations described below could be produced by laying separate films and tie layers (of different materials such as PVB, TPU, EVA, ionomer and others having various thicknesses and with different plasticizer types and amounts) with an HOE film or layer via the hand lay-up method. The coatings or tie layers can be applied using any known industrial process, such as by dissolving the adhesive material (e.g., PVB resin) in a solution containing an organic solvent or forming an aqueous solution of the adhesive material, and applying that solution with a roll-to-roll slot die process, followed by evaporation of the organic solvent or water in an oven. Alternatively, the material may be applied by other coating or deposition techniques either alone, as a suspension, or dissolved in another material known to one skilled in the art. The HOE film is a single element polymer film that changes the way that light travels through the medium using holographic techniques and is made up of a series of continuous optical elements strung together to make a mirror like surface that reflects light at a specific set of angles (while not reflecting light at any other angle). The structures formed with the coating(s) or tie layer(s) and protective substrate, HOE film and optional polymer layer(s) are then laminated between two annealed glass sheets such as glass sheets each having thicknesses of 2.3 mm. The lamination process utilizes a vacuum laminator to laminate all samples, which involved: (1) assembly of the substrates, interlayers, and HOE film in the prescribed order and placing into a vacuum bag; (2) applying a vacuum at room temperature for 20 minutes followed by an additional 60 minutes at 105° C.; and (3) removing the samples from the vacuum bag and autoclaving with hold conditions of 125° C. and 13 bar for 40 minutes. Multiple samples could be produced using this lamination technique, as further described below.

A control laminate having a glass/PVB/HOE/PVB/glass construction could be produced using two layers of a polymer interlayer such as PVB formulated with conventional plasticizer (such as 3GEH plasticizer) and an HOE film encapsulated between the two PVB layers. The laminate stack is then laminated in a vacuum bag de-air process followed by a standard autoclave lamination process as known in the art. The finished construction would comprise a working volume hologram with peak reflections near the initially programmed wavelength. The signal intensity of the hologram would be reduced due to a lower concentration of LRIC plasticizer in the HOE layer following redistribution across the full thickness of the volume hologram layer and the PVB layer encapsulating the holographic element or volume hologram.

Example laminates having the constructions described below could also be produced in the same manner using coatings or tie layers, HOE films and optional polymer layers, and laminating this structure between one or two rigid substrates as shown below.

Control Example

Figure 3:
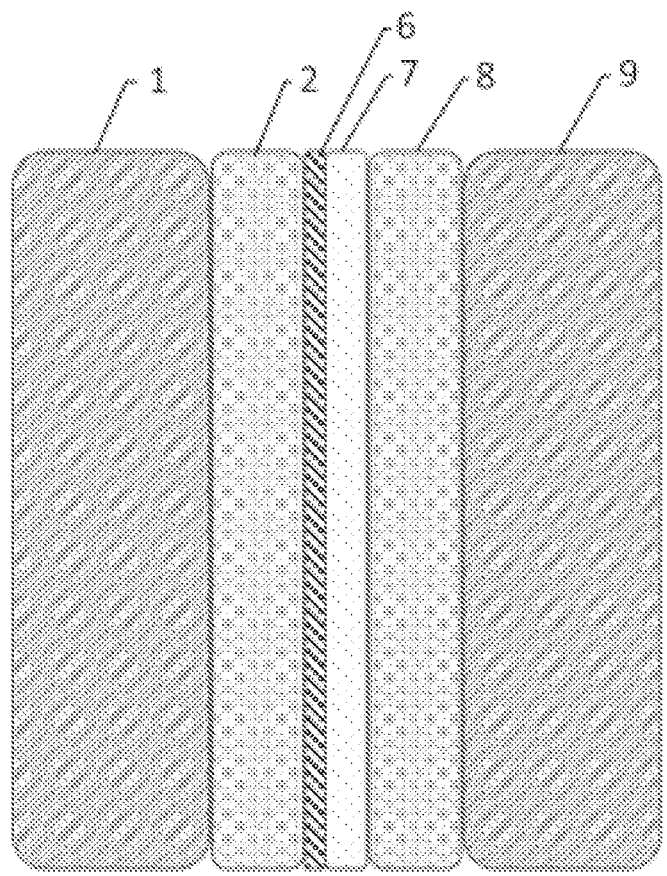
FIG. 3 depicts another cross-sectional view of another embodiment of a glass laminate containing an HOE film showing the holographic element and the holographic element substrate encapsulated between two interlayers.

FIG. 3 depicts a control embodiment of a glass laminate containing an HOE film showing the holographic element and the holographic element substrate encapsulated between two interlayers without a tie layer or coating and protective substrate. As shown in FIG. 3, the interlayers 2 and 8 encapsulate the HOE film (made up of the holographic element 6 and holographic element substrate 7) to form a multilayer structure, and the entire multilayer structure is interposed between two rigid substrates 1 and 9, such as glass.

Example 1

Figure 4:
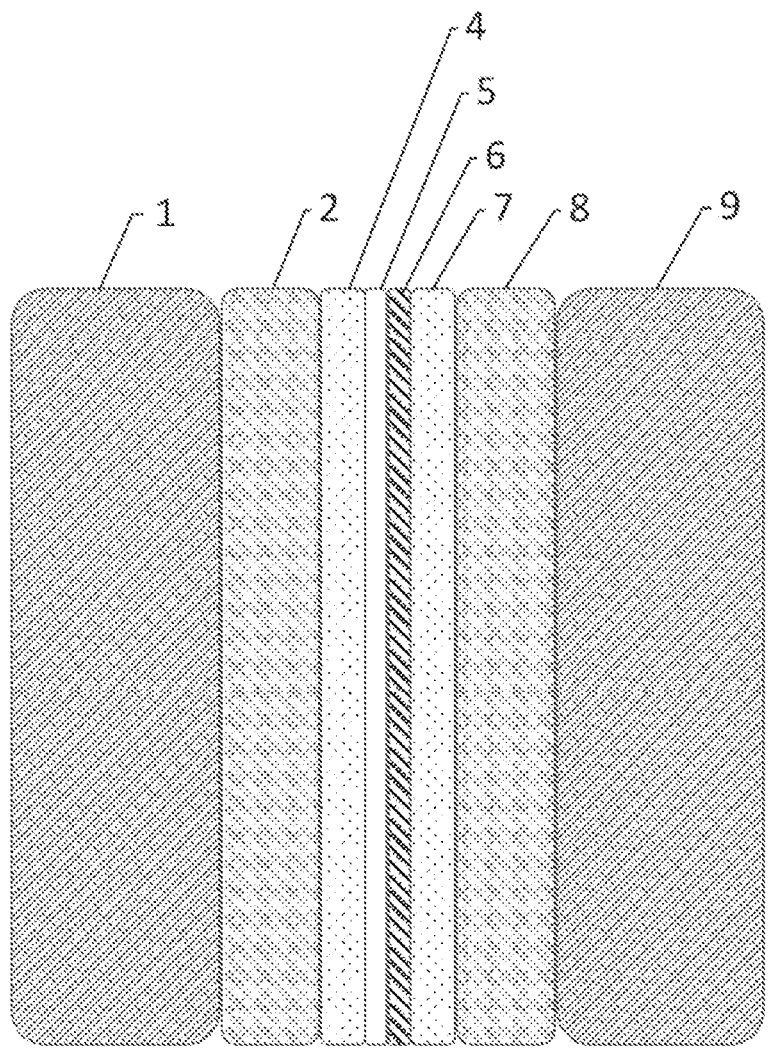
FIG. 4 depicts a cross-sectional view of another embodiment of a glass laminate containing an HOE film showing the holographic element and the holographic element substrate encapsulated between two interlayers with a protective element substrate and protective element tie layer adjacent the HOE film.

FIG. 4 depicts a cross-sectional view of one embodiment of a glass laminate containing an HOE film showing the holographic element and the holographic element substrate encapsulated between two interlayers with a protective element substrate and protective element tie layer adjacent the HOE film. As shown in FIG. 4, a protective tie layer 5 is located adjacent the holographic element 6 and a protective substrate 4 is adjacent the tie layer 5 and interlayer 2. The interlayers 2 and 8 encapsulate the HOE film (made up of the holographic element 6 and holographic element substrate 7), tie layer 5 and protective substrate 4 to form a multilayer structure, and the entire multilayer structure is interposed between two rigid substrates 1 and 9, such as glass.

In the embodiment shown in FIG. 4, the interlayers can be any polymeric film, such as PVB, TPU, EVA, ionomer or any polymer as described above. The protective tie layer 5 is adjacent to and in direct contact with the holographic element 6 on one side and the protective substrate 4 on the other side. The tie layer can be any material that will provide the necessary adhesion between the HOE film (or the holographic element 6) and the protective substrate 4, such as PVB, TPU, EVA, ionomer or other polymers known in the art. The tie layer 5 comprises a LRIC, such as (Bis(2,2,3,3,4,4,5,5,6,6,7,7-dodecafluoroheptyl) (2,2,4-trimethylhexane-1,6-diyl)biscarbamate (Fluoro LRIC plasticizer) plasticizer. An adhesion promoter may also be used if desired to improve the adhesion between layers. The protective substrate 4 provides a barrier or protection layer to prevent plasticizer (or other materials) from migrating from the interlayer to the holographic element and to prevent the LRIC and other materials in the holographic element 6 from migrating out of the holographic element and therefore reducing the effectiveness of the HOE film. The protective substrate 4 may be any material as previously described, such as PET, PEN, polycarbonate, polyamide, polyimide, cellulose ester, polyester, and the like. The protective substrate may be the same material as the holographic element substrate 7 or it may be different.

Example 2

Figure 5:
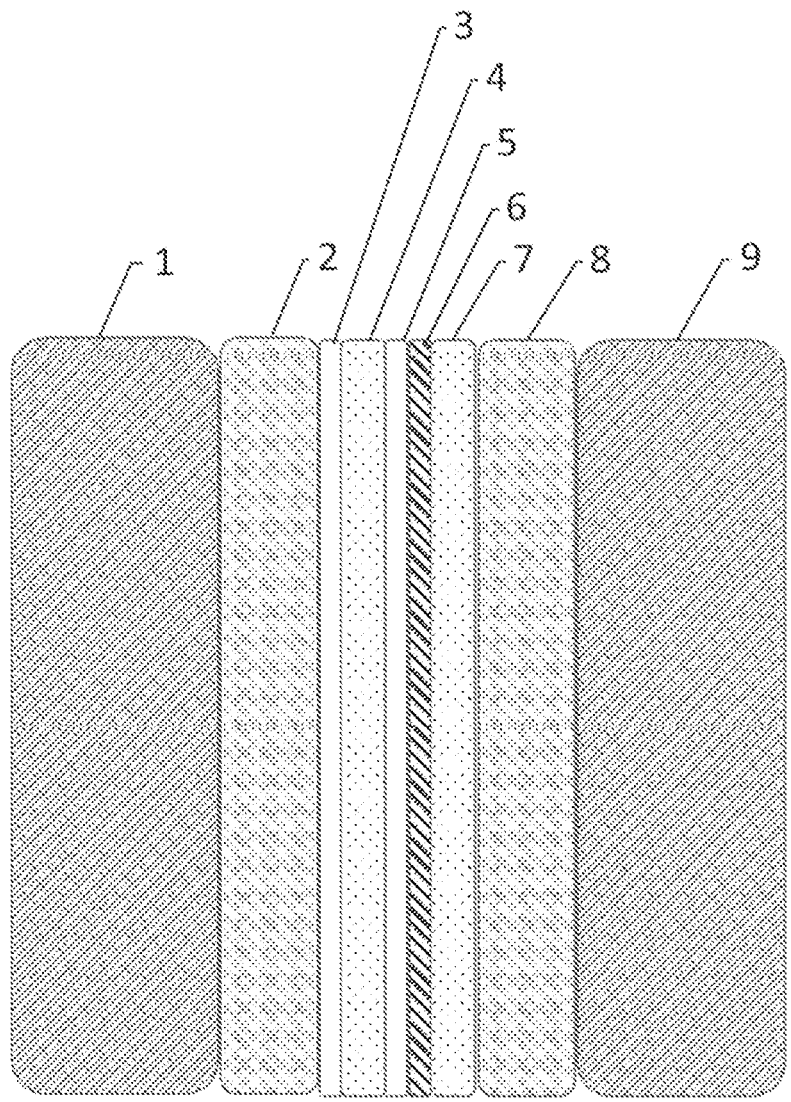
FIG. 5 depicts a cross-sectional view of another embodiment of a glass laminate containing an HOE film showing the holographic element and the holographic element substrate encapsulated between two interlayers with a protective element substrate encapsulated by two protective element tie layers adjacent the HOE film.

FIG. 5 depicts a cross-sectional view of another embodiment of a glass laminate containing an HOE film showing the holographic element and the holographic element substrate encapsulated between two interlayers with a protective element substrate encapsulated by two protective element tie layers adjacent the HOE film. As shown in FIG. 5, a protective tie layer 5 is located adjacent the holographic element 6 and a protective substrate 4 is adjacent the tie layer 5. A second tie layer 3 is adjacent and between the protective substrate 4 and the interlayer 2. The interlayers 2 and 8 encapsulate the HOE film (made up of the holographic element 6 and holographic element substrate 7), tie layers 3 and 5 and protective substrate 4 to form a multilayer structure, and the entire multilayer structure is interposed between two rigid substrates 1 and 9, such as glass.

In the embodiment shown in FIG. 5, the polymer interlayers 2 and 8 can be any polymeric film, such as PVB, TPU, EVA, ionomer or any polymer as described above. The protective tie layer 5 is adjacent to and in direct contact with the holographic element 6 on one side and the protective substrate 4 on the other side. The tie layer 5 can be any material that will provide the necessary adhesion between the HOE film (or the holographic element 6) and the protective substrate 4, such as PVB, TPU, EVA, ionomer or other polymers known in the art. The tie layer comprises a LRIC, such as Fluoro LRIC plasticizer. An adhesion promoter may also be used if desired to improve the adhesion between layers. The protective substrate 4 provides a barrier or protection layer to prevent plasticizer (or other materials) from migrating from the interlayer to the holographic element and to prevent the LRIC and other materials in the holographic element 6 from migrating out of the holographic element and therefore reducing the effectiveness of the HOE film. The protective tie layer 3 may be the same as the protective tie layer 5 or it may be different. Additionally, protective tie layer 3 may comprise a different or additional plasticizers since it is adjacent the protective substrate 4, which will prevent unwanted plasticizer migration to the holographic element 6. The protective substrate 4 may be any material as previously described, such as PET, PEN, polycarbonate, polyamide, polyimide, cellulose ester, polyester, and the like. The protective substrate may be the same material as the holographic element substrate 7 or it may be different.

Example 3

Figure 6:
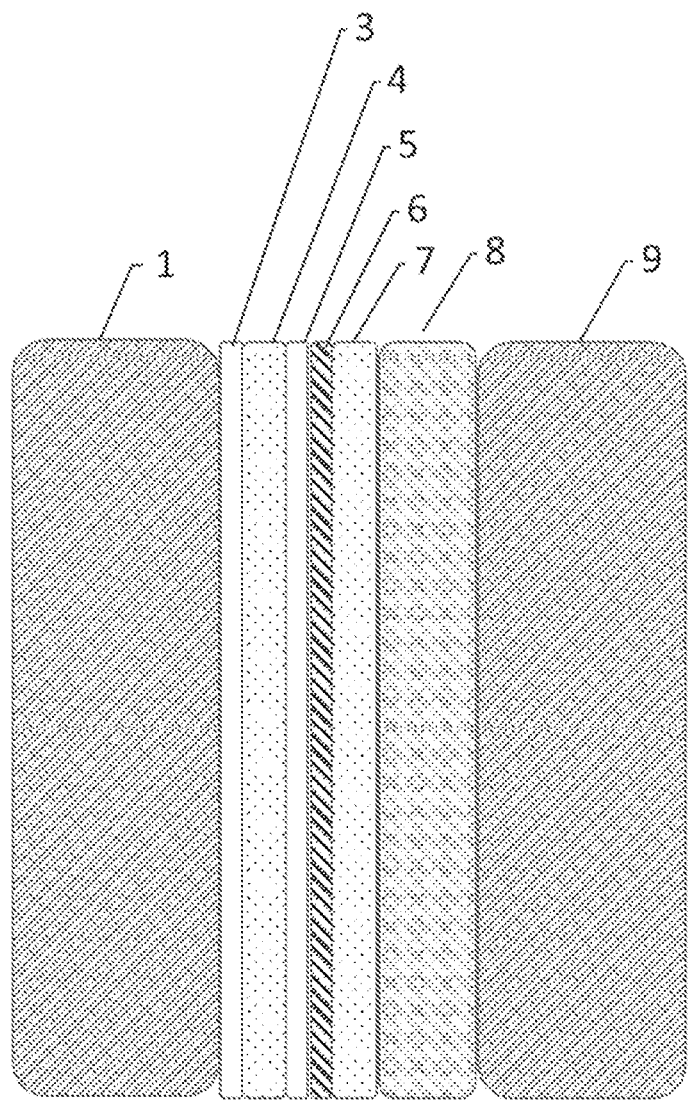
FIG. 6 depicts a cross-sectional view of another embodiment of a glass laminate containing an HOE film showing the holographic element and the holographic element substrate encapsulated between an interlayer and a protective element substrate encapsulated by two protective element tie layers adjacent the HOE film.

FIG. 6 depicts a cross-sectional view of another embodiment of a glass laminate containing an HOE film showing the holographic element and the holographic element substrate encapsulated between an interlayer and a protective element substrate encapsulated by two protective element tie layers adjacent the HOE film. As shown in FIG. 6, a protective tie layer 5 is located adjacent the holographic element 6 and a protective substrate 4 is adjacent the tie layer 5. A second tie layer 3 is adjacent the protective substrate 4. Interlayer 8 is adjacent the holographic element substrate 7. Tie layer 3 and interlayer 8 encapsulate the HOE film (made up of the holographic element 6 and holographic element substrate 7), tie layer 5 and protective substrate 4 to form a multilayer structure, and the entire multilayer structure is interposed between two rigid substrates 1 and 9, such as glass.

In the embodiment shown in FIG. 6, the interlayer 8 can be any polymeric film, such as PVB, TPU, EVA, ionomer or any polymer as described above. The protective tie layer 5 is adjacent to and in direct contact with the holographic element 6 on one side and the protective substrate 4 on the other side. The tie layer 5 can be any material that will provide the necessary adhesion between the HOE film (or the holographic element 6) and the protective substrate 4, such as PVB, TPU, EVA, ionomer or other polymers known in the art. The tie layer comprises a LRIC, such as Fluoro LRIC plasticizer. An adhesion promoter may also be used if desired to improve the adhesion between layers. The protective substrate 4 provides a barrier or protection layer to prevent plasticizer (or other materials) from migrating from the interlayer to the holographic element and to prevent the LRIC and other materials in the holographic element 6 from migrating out of the holographic element and therefore reducing the effectiveness of the HOE film. The protective tie layer 3 may be the same as the protective tie layer 5 or it may be different. Additionally, protective tie layer 3 may comprise a different or additional plasticizers since it is adjacent the protective substrate 4, which will prevent unwanted plasticizer migration to the holographic element 6. The protective substrate 4 may be any material as previously described, such as PET, PEN, polycarbonate, polyamide, polyimide, cellulose ester, polyester, and the like. The protective substrate may be the same material as the holographic element substrate 7 or it may be different.

Example 4

Figure 7:
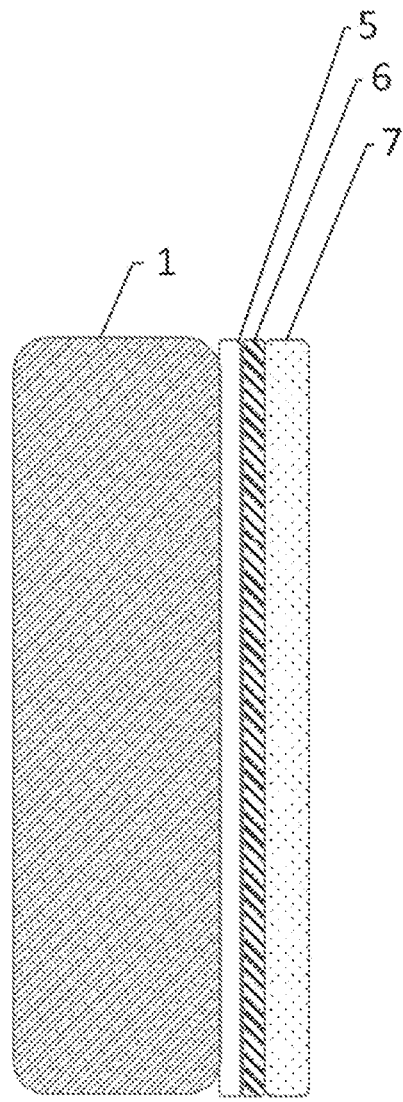
FIG. 7 depicts a cross-sectional view of another embodiment of a glass laminate having only one glass or rigid layer containing an HOE film showing the holographic element and the holographic element substrate protected by a coating or tie layer.

FIG. 7 depicts a cross-sectional view of another embodiment of a glass laminate having only one glass or rigid layer containing an HOE film showing the holographic element and the holographic element substrate protected by a coating or tie layer. As shown in FIG. 7, a protective tie layer 5 is located adjacent the HOE film (comprising holographic element 6 and holographic element substrate 7). The tie layer 5 and HOE film form a multilayer structure which is bonded to a rigid substrate 1, such as glass. The multilayer structure of FIG. 7 can then be used in another application, bonded to a second rigid substrate, or bonded to another apparatus as desired.

In the embodiment shown in FIG. 7, the protective tie layer 5 is adjacent to and in direct contact with the holographic element 6 on one side and the rigid substrate 1 on the other side. The tie layer 5 can be any material that will provide the necessary adhesion between the HOE film (or the holographic element 6) and the rigid substrate 1, such as PVB, TPU, EVA, ionomer or other polymers known in the art. The tie layer 5 comprises a LRIC, such as Fluoro LRIC plasticizer. An adhesion promoter may also be used if desired to improve the adhesion between layers.

Example 5

Figure 8:
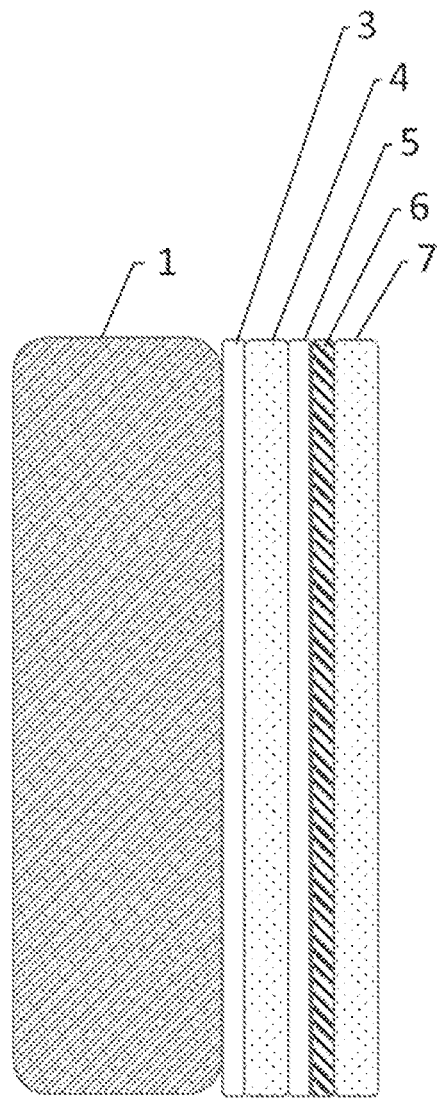
FIG. 8 depicts a cross-sectional view of another embodiment of a glass laminate having only one glass or rigid layer containing an HOE film showing the holographic element and the holographic element substrate protected by a protective element substrate encapsulated by two protective element tie layers adjacent the HOE film.

FIG. 8 depicts a cross-sectional view of another embodiment of a glass laminate having only one glass or rigid layer containing an HOE film showing the holographic element and the holographic element substrate protected by a protective element substrate encapsulated by two protective element tie layers adjacent the HOE film. As shown in FIG. 8, a protective tie layer 5 is located adjacent the holographic element 6 and a protective substrate 4 is adjacent the tie layer 5. A second tie layer 3 is adjacent the protective substrate 4. The tie layers 3 and 5, the protective substrate 4 and HOE film form a multilayer structure which is bonded to a rigid substrate 1, such as glass. The multilayer structure of FIG. 8 can then be used in another application, bonded to a second rigid substrate, or bonded to another apparatus as desired.

In the embodiment shown in FIG. 8, the protective tie layer 5 is adjacent to and in direct contact with the holographic element 6 on one side and the protective substrate 4 is adjacent the tie layer 5. A second tie layer 3 is adjacent the protective substrate 4. The tie layer 5 can be any material that will provide the necessary adhesion between the HOE film (or the holographic element 6) and the rigid substrate 1, such as PVB, TPU, EVA, ionomer or other polymers known in the art. The tie layer 5 comprises a LRIC, such as Fluoro LRIC plasticizer. The protective tie layer 3 may be the same as the protective tie layer 5 or it may be different. Additionally, protective tie layer 3 may comprise a different or additional plasticizers since it is adjacent the protective substrate 4, which will prevent unwanted plasticizer migration to the holographic element 6. The protective substrate 4 may be any material as previously described, such as PET, PEN, polycarbonate, polyamide, polyimide, cellulose ester, polyester, and the like. The protective substrate may be the same material as the holographic element substrate 7 or it may be different. An adhesion promoter may also be used if desired to improve the adhesion between layers.

Incorporating a LRIC plasticizer into a tie layer as described above will provide a laminate with an HOE film where the signal intensity can be maintained. When a blend of LRIC and conventional plasticizer is used, the signal intensity will be slightly reduced, but would be better than in laminates where only a conventional plasticizer, such as 3GEH, was used in the tie layer(s).

Constructions produced with tie layers that do not contain the Fluoro LRIC would exhibit significantly lower holographic efficiency, observed in practice through a significant in reduction in reflected signal intensity. Incorporating LRICs, such as a Fluoro LRIC, into the coating(s) or tie layer(s) (and optionally into the polymer layer), generally makes it possible to maintain the signal intensity. This effect is achieved by incorporating sufficient Fluoro LRIC in the tie layer to prevent concentration gradients that would otherwise result in the migration of Fluoro LRIC out of the original HOE film and into the tie layer or coating. This effect is will occur for LRIC's of different chemical composition; as long as the concentration levels in the tie layer are designed in such a way as to prevent diffusion of the LRIC from the HOE film to the tie layer, the refractive index gradients in the HOE can be maintained LRIC.

Changing the formulation can also lead to improved results following HOE lamination. Producing a construction with lower levels of 3GEH plasticizer can lead to less HOE intensity loss than a construction having a tie layer or coating that only contains a conventional plasticizer such as 3GEH. Changes to the chemical nature of the PVB can also lead to similar improvements. However, in many polymer layers, formulation changes can help to improve the partitioning but are unlikely to completely prevent LRIC loss from the HOE to a tie layer that does not contain LRICs. It has been discovered, however, that improvements to the chemical interlayer formulation are particularly effective when combined with addition of LRICs.

It is also expected that similar improvements can be accomplished by formulating tie layers with LRICs that are different from those present in the HOE, as long as the LRICs present in the tie layer(s) and the HOE film are chemically similar and closely matched in refractive index. LRIC's with dissimilar chemical structures may be used to achieve the same effect, but will need to be carefully selected in order to achieve a partitioning ratio that maintains the desired grating spacing and refractive indices within the HOE film.

Some HOE films are created without the use of LRICs, relying instead on the refractive indices of the polymer gratings to accomplish the holographic effects. In such cases, it is possible to employ tie layers with LRICs to supply such HOE films with refractive index modifiers to increase the refractive index differences between the grating phases. Such an approach would increase the effectiveness of the overall hologram.

It is also possible to simplify the manufacturing of the HOE film process by designing a holographic photopolymer film with no LRICs, with the understanding that these LRICs will be formulated into the tie layer at the time of lamination (i.e., the LRICs will migrate from the tie layer to the HOE film). This effectively turns the tie layer into an LRIC delivery system. In such cases, it is expected that the HOE patterning system will have to be modified in order to create fringes with initial dimensions designed to change to desired levels following LRIC equilibration after lamination.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject. As used herein, the terms "having," "has," and "have" have the same open-ended meaning as "comprising," "comprises," and "comprise" provided above. As used herein, the terms "including," "include," and "included" have the same open-ended meaning as "comprising," "comprises," and "comprise" provided above.

As used herein, the term "about" refers to values within ten percent of the recited value. The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

In certain embodiments, multiple polymer layers or substrate layers may be used in the manufacturing process to produce laminated structures. In such cases, polymer or substrate layers may be described as first or second polymer or substrate layers. As used herein, the terms "first", "second", and the like are used to describe various elements, but such elements should not be unnecessarily limited by these terms. These terms are only used to distinguish one element from another and do not necessarily imply a specific order or even a specific element. For example, an element may be regarded as a "first" element in the description and a "second" element in the claims without being inconsistent. Consistency is maintained within the description and for each independent claim, but such nomenclature is not necessarily intended to be consistent therebetween.

Examples of various tie layers and optional polymer interlayers used to encapsulate holographic optical elements and laminates comprising these tie layers include, but are not limited to the following. One skilled in the art will understand that various combinations and properties can be changed as desired.

A tie layer may be used to encapsulate a polymeric volume hologram, wherein the tie layer comprises a total quantity of plasticizer within a range of −25 to 25 weight percent of the concentration of plasticizer in the original polymeric volume hologram. In embodiments, the tie layer comprises a total quantity of plasticizer within a range of −15 to 15 weight percent, or −10 to 10 weight percent, −5 to 5 weight percent, of the concentration of plasticizer in the original polymeric volume hologram.

In embodiments, the tie layer comprises polymers or elastomers or blends of polymers or elastomers selected from polyurethanes, poly(vinyl acetal)s such as poly(vinyl butyral), ethylene vinyl acetate copolymers, polyvinyl alcohols, and ionomers.

In embodiments, the tie layer comprises a plasticizer or plasticizer blend that is the same as the plasticizer or plasticizer blend in the polymeric volume hologram. In other embodiments, the tie layer comprises at least one plasticizer or plasticizer blend that is different from the plasticizer or plasticizer blend in the polymeric volume hologram.

In embodiments, the tie layer comprises a plasticizer or plasticizer blend wherein the plasticizer or plasticizer blend is selected to have a refractive index within a range of −0.1 to +0.1 of the refractive index of the plasticizer or plasticizer blend in the original polymeric volume hologram. In embodiments, the plasticizer or plasticizer blend is selected to have a refractive index within a range of −0.05 to +0.05, or a range of −0.02 to +0.02 of the refractive index of the plasticizer or plasticizer blend in the original polymeric volume hologram.

In embodiments, a multilayer construction comprises the tie layer, optional polymer interlayer and a polymeric volume hologram wherein the tie layer is in direct contact with the polymeric volume hologram. In other embodiments, the multilayer construction comprises a second tie layer. The tie layer may comprise any of the polymers described above. In other embodiments, a polymer interlayer is also included, wherein the polymer interlayer is adjacent a protective substrate which is between the polymer interlayer and the tie layer.

In embodiments, the polymer interlayer is selected to minimize plasticizer uptake such that the plasticizer level in the fully encapsulated polymeric volume hologram is at least 50%, at least 60%, at least 70%, at least 80%, or at least 90% of the starting level of plasticizer.

In embodiments, the polymeric film has a thickness in the range of from 0.05 mm to 1.5 mm, from 0.1 mm to 0.8 mm, or from 0.2 mm to 0.4 mm.

In embodiments, the coating or tie layer has a thickness of at least about 5 microns, at least 10, at least 15, at least 20, at least 25, at least 30, at least 35, at least 40, at least 45, or at least 50 microns or more. Other thicknesses may be used, depending on the desired properties and materials used.

In embodiments, the tie layer further comprises an adhesion promoter. In embodiments, the adhesion promotor comprises a silane adhesion promoter. In embodiments, the adhesion promoter is incorporated into the tie layer.

In embodiments, a polymer interlayer is also included, and the polymer interlayer has additional functionality, such as acoustic sound damping features, constant or variable angle wedge, dyes, particles, infrared or solar absorbers, or layers to selectively block portions of the electromagnetic spectrum.

In embodiments, a first and second polymer interlayer are included, and in some embodiments, the polymer interlayers are the same. In other embodiments, the first and second polymer interlayers are different. In embodiments, at least one of the first and second polymer interlayers is a multiple layer interlayer.

In embodiments, two or more tie layers are used. The tie layers may be the same or different.

In embodiments, the laminate further comprises a tie layer disposed between the first polymer layer and the polymeric volume hologram. In embodiments, the laminate further comprises a tie layer disposed between the second polymer layer and the polymeric volume hologram. In embodiments, the laminate further comprises a tie layer disposed between both the first polymer layer and the polymeric volume hologram and the second polymer layer and the polymeric volume hologram.

In embodiments, a tie layer is used to encapsulate a polymeric volume hologram, wherein the tie layer comprises a concentration of a low refractive index compound, for use in lamination with a polymeric volume hologram film, such that the light modification properties of the polymeric volume hologram, following lamination and low refractive index compound equilibration with the polymer interlayer, are greater than 70%, preferably greater than 80%, and most preferably greater than 90% of the magnitude of the original light modification properties in at least one wavelength range.

In embodiments, a structure comprises a polymeric volume hologram and a tie layer used to encapsulate the polymeric volume hologram, wherein the tie layer comprises a concentration of a low refractive index compound, wherein the light modification properties of the polymeric volume hologram following lamination and low refractive index compound equilibration with the tie layer are greater than 70% of the magnitude of the original light modification properties in at least one wavelength range.

In embodiments, a structure comprises a polymeric volume hologram having no low refractive index compound, and a tie layer used to encapsulate the polymeric volume hologram, wherein the tie layer comprises a concentration of a low refractive index plasticizer, wherein the light modification properties of the polymeric volume hologram following lamination and low refractive index compound equilibration with the tie layer are greater than 70% of the magnitude of the original light modification properties in at least one wavelength range. In embodiments, the light modification properties of the polymeric volume hologram following lamination and low refractive index compound equilibration with the tie layer are greater than 80%, 90%, 100%, 200%, 300%, 400%, 500%, 600%, 700%, 800%, 900%, or great than 1000% of the magnitude of the original light modification properties in at least one wavelength range.

In embodiments, a structure comprises a polymeric volume hologram and a tie layer adjacent the polymeric volume hologram, wherein the tie layer comprises a concentration of low refractive index compound within a range of −25 to +25 weight percent of the concentration of low refractive index compound in the polymeric volume hologram.

In embodiments, the tie layer comprises a total quantity of plasticizer within a range of 0 to 50 weight percent of the structure. In embodiments, the tie layer comprises polymers or elastomers or blends of polymers or elastomers selected from polyurethanes, poly(vinyl acetal)s such as poly(vinyl butyral), ethylene vinyl acetate copolymers, polyvinyl alcohols, cellulose esters, polyolefin elastomers, acrylic resins, polysiloxanes and ionomers.

In embodiments, the tie layer comprises at least one low refractive index compound that is selected to have a refractive index within a range of −0.1 to +0.1 of the refractive index of the low refractive index compound in the polymeric volume hologram.

In embodiments, the tie layer is in direct contact with the polymeric volume hologram. In embodiments, the multilayer interlayer further comprises a polymer interlayer, wherein the polymer interlayer is adjacent a protective substrate which is between the polymer interlayer and the tie layer. In embodiments, the polymer interlayer comprises a low refractive index compound, and wherein the tie layer allows the low refractive index compound in the polymer interlayer to migrate from the polymer interlayer into the polymeric volume hologram, from the polymeric volume hologram into the polymer interlayer or both from the polymer interlayer into the polymeric volume hologram and from the polymeric volume hologram into the polymer interlayer. In embodiments, the polymer interlayer is selected such that the low refractive index compound level in the polymeric volume hologram is at least 50% of the starting level of low refractive index compound originally contained within the polymeric volume hologram film.

In embodiments, the multilayer interlayer comprises a second tie layer. In embodiments, the multilayer interlayer comprises a second polymer interlayer, at least one of the first and second polymer interlayers is a multilayer polymer interlayer.

In embodiments, the tie layer incorporates more than 50% of the low refractive index compound for proper functioning of the fully laminated structure containing the tie layer and polymeric volume hologram.

In embodiments, there is an unpatterned photopolymer film designed for the creation of a polymeric volume hologram film, created without refractive index modifying plasticizer or plasticizer blends, for use in lamination with interlayers containing refractive index modifying plasticizers, at levels of more than 50%, preferably more than 75%, preferably more than 90%, to achieve proper functioning of the fully laminated structure containing the polymer interlayer and polymeric volume hologram.

In embodiments, there is a patterned polymeric volume hologram film, without refractive index modifying plasticizer or plasticizer blends, for use in lamination with interlayers containing refractive index modifying plasticizers, at levels of more than 50%, preferably more than 75%, preferably more than 90%, to achieve proper functioning of the fully laminated structure containing the polymer interlayer and polymeric volume hologram.

In embodiments, the polymeric volume hologram comprises a patterned or an unpatterned photopolymer film, wherein the polymeric volume hologram comprises no plasticizers when manufactured.

In embodiments, the gratings are patterned so as to achieve the desired optical response following plasticizer re-equilibration after lamination. In embodiments, the light modification efficiency of the gratings is increased by at least 25%, at least 50%, at least 75%, at least 100%, at least 500%, or at least 1000% following plasticizer re-equilibration after lamination.

In embodiments, a manufacturing process comprises the creation of a set of refractive index gratings within a polymeric volume hologram film, with the pattern of the gratings designed to achieve a desired pattern only after lamination and low refractive index compound equilibration.

In embodiments, the substrate comprises glass, polycarbonate, polyethylene terephthalate, acrylic, polyester, polyamide or cellulose triacetate.

In embodiments, a laminate comprises at least one substrate and any of the multilayer interlayers described herein.

What is claimed:
1. A manufacturing process comprising the steps of:
providing a first polymer layer, a tie layer comprising a low refractive index compound, and a polymeric volume hologram, assembling the first polymer layer, the tie layer and the polymeric volume hologram to form an assembly, providing at least a first substrate wherein the first substrate is adjacent the first polymer layer, and laminating the assembly with the at least first substrate to form a laminated structure, wherein the laminated structure has partitioned low refractive index compound levels within the polymeric volume hologram such that the light modification properties of the polymeric volume hologram following lamination and low refractive index compound equilibration with the tie layer are greater than 70% of the magnitude of the original light modification properties of the polymeric hologram prior to assembly, in at least one wavelength range; wherein the tie layer comprises a concentration of low refractive index compound within a range of −25 to +25 weight percent of the concentration of low refractive index compound in the polymeric volume hologram; wherein the manufacturing process further comprises a polymer film adjacent the tie layer, wherein the polymer film is disposed between the first polymer layer and the tie layer; and wherein the polymer film prevents migration of the low refractive index compound to the polymer layer from the tie layer and/or the polymeric volume hologram.

2. The manufacturing process of claim 1, wherein the initial polymeric volume hologram contains no low refractive index compound.

3. The manufacturing process of claim 1, wherein the initial polymeric volume hologram comprises at least one low refractive index compound.

4. The manufacturing process of claim 1, further comprising one or more additional polymer layers.

5. The manufacturing process of claim 1, wherein the polymeric volume hologram is disposed on a second substrate.

6. The manufacturing process of claim 1, further comprising a second substrate.

7. The manufacturing process of claim 3, wherein the low refractive index compound in the tie layer is different from the low refractive index compound in the polymeric volume hologram.

8. The manufacturing process of claim 3, wherein the tie layer comprises a concentration of low refractive index compound within a range of −25 to +25 weight percent of the concentration of low refractive index compound in the polymeric volume hologram.

9. The manufacturing process of claim 1, wherein the tie layer comprises a total quantity of low refractive index compound within a range of greater than 0 to less than 50 weight percent of the laminated structure.

10. The manufacturing process of claim 1, wherein the tie layer comprises polymers or elastomers or blends of polymers or elastomers selected from polyurethanes, poly(vinyl acetal) s such as poly(vinyl butyral), ethylene vinyl acetate copolymers, polyvinyl alcohols, cellulose esters, polyolefin elastomers, acrylic resins, polysiloxanes and ionomers.

11. The manufacturing process of claim 3, wherein the low refractive index compound in the tie layer is selected to have a refractive index within a range of −0.1 to +0.1 of the refractive index of the low refractive index compound in the polymeric volume hologram.

12. The manufacturing process of claim 1, wherein the tie layer further comprises an adhesion promoter.

13. The manufacturing process of claim 1, wherein at least a portion of the polymer layer has at least one of: an interlayer that is tapered, acoustic dampening properties, or elements to selectively block portions of the electromagnetic spectrum, or wherein the polymer layer comprises at least one of the following: dyes, colorants, pigments, particles, infrared or solar absorbers.

14. The manufacturing process of claim 1, wherein the low refractive index compound comprises at least two different low refractive index compounds.

15. The manufacturing process of claim 1, wherein the polymeric volume hologram comprises a patterned or an unpatterned photopolymer film, wherein the polymeric volume hologram comprises no low refractive index compound prior to the assembly step.

16. The manufacturing process of claim 1, the light modification properties of the polymeric volume hologram following lamination and equilibration of the low refractive index compound with the tie layer are greater than 100% of the magnitude of the original light modification properties of the polymeric hologram prior to assembly, in at least one wavelength range.

17. A laminated structure made by the manufacturing process of claim 1.

* * * * *